United States Patent

Thomas, Jr. et al.

[11] 4,122,712
[45] Oct. 31, 1978

[54] FLUID VELOCITY MEASURING DEVICE

[75] Inventors: David F. Thomas, Jr.; Leon A. Williams, Jr., both of Hampton, Va.

[73] Assignee: The United States of America as represented by the United States National Aeronautics and Space Administration, Washington, D.C.

[21] Appl. No.: 856,461

[22] Filed: Nov. 30, 1977

[51] Int. Cl.$^2$ .............................................. G01F 1/32
[52] U.S. Cl. .................................... 73/189; 73/194 VS
[58] Field of Search ................ 73/189, 194 VS, 194 B

[56] References Cited

U.S. PATENT DOCUMENTS

| | | | |
|---|---|---|---|
| 3,452,594 | 7/1969 | Dale | 73/194 |
| 3,645,132 | 2/1972 | Rasmussen | 73/189 |
| 3,720,104 | 3/1973 | Zanker | 73/194 |
| 3,785,203 | 1/1974 | Mull | 73/170 |
| 3,797,309 | 3/1974 | Joy et al. | 73/194 |

Primary Examiner—Herbert Goldstein
Attorney, Agent, or Firm—Wallace J. Nelson; Howard J. Osborn; John R. Manning

[57] ABSTRACT

A fluid velocity measuring device which when placed in a freestream fluid flow causes vortices to be formed at a frequency proportional to the flow rate of the fluid. Sensors on the device generate electric signals with frequency proportional to the rate of vortex creation and with relative mean amplitudes indicative of fluid flow direction. Electric circuitry translates the electric signals into indications of fluid speed and direction.

7 Claims, 6 Drawing Figures

FIG. 3
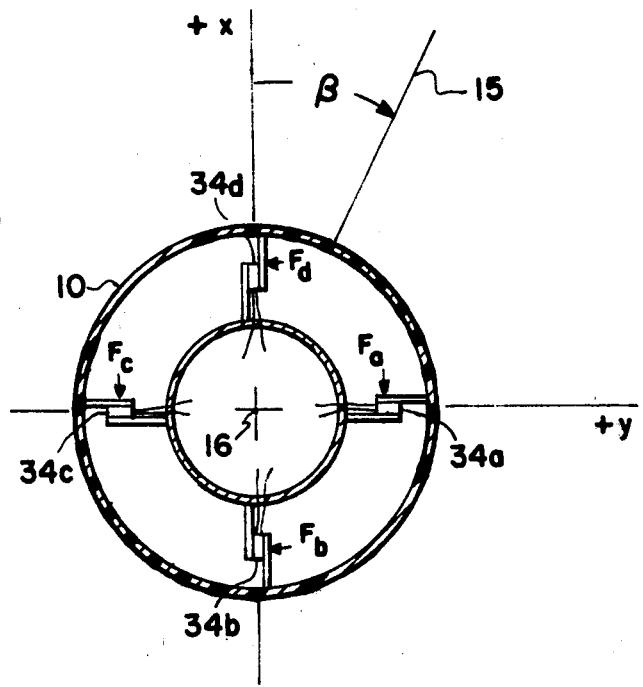
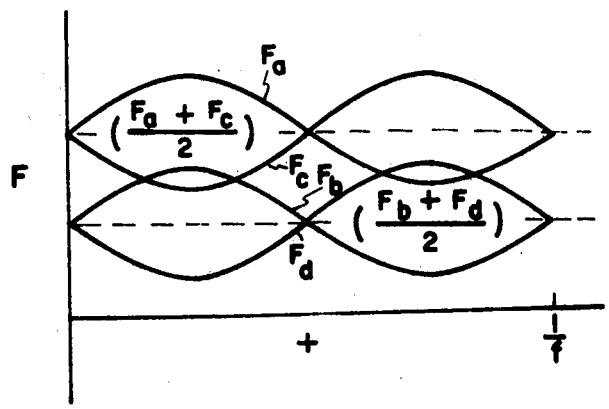
FIG. 5 ent invention.

FLUID VELOCITY MEASURING DEVICE

ORIGIN OF THE INVENTION

The invention described herein was made by employees of the United States Government and may be manufactured and used by or for the government for governmental purposes without payment of any royalties thereon or therefor.

BACKGROUND OF THE INVENTION

This invention relates to a fluid velocity measuring device. More particularly, it relates to a fluid velocity measuring device wherein oscillating rotary forces on the device arising from the shedding of vortices created by the passing of a freestream of fluid around the device and translational drag forces on the device are detected by piezoelectric sensor crystals which create electric signals from which fluid velocity components of speed and direction are deduced by an electric circuit. Previously, the measurement of freestream fluid flow velocity was accomplished by the utilization of two separate instruments: one to measure flow speed, e.g. pitot-static tube, venturi tube, bridled pressure plate; and the other to measure flow direction, e.g. directional vane (wind vane, weather vane). The present invention measures freestream flow velocity with a single device.

The utilization of the vortex street phenomenon as an indication of fluid speed is well known in the prior art. When a body is placed in a stream of fluid flow with a Reynolds number between $10^2$ and $10^5$, vortices are shed alternately from either side of the body at a frequency proportional to the speed of fluid flow.

The prior art, however, limits the application of the vortex street phenomenon to flow inside a conduit with the relationship between vortex creation frequency and fluid speed being dependent upon the conduit diameter. The present invention imposes no such requirement and may be mounted in a freestream of fluid such as the air for measuring wind velocities, or in a wind tunnel for measuring air stream perturbations created by aircraft wings and fuselages, or in the ocean or river for measuring water current velocities. The present invention measures vortex creation frequency at the point of creation whereas prior art devices counted the vortex creation frequency at a remote spot somewhat downstream. Downstream counting may lead to unacceptable accuracy since extraneous currents may induce error. Furthermore, downstream counting is impractical in a freestream since the counter would require repositioning for each change in fluid flow direction. One known device which utilizes temperature sensors to determine vortex creation frequency at the point of creation requires precision aligning and it is impractical for use in a freestream fluid. Some advantages of the present invention are, firstly, the consolidation of the functions of both of these types of instruments into one simple solid state device with no moving parts, and secondly, that both flow speed and flow direction can be measured at the same time at the same place.

An object of the present invention is a fluid velocity measuring device adapted to accurately measure freestream fluid flow speed and direction utilizing translational drag and vortex formation phenomenon.

A further object of this invention is a fluid velocity measuring device which yields the foregoing advantages and which also measures fluid flow speed and direction at the same time and at the same place.

A further object of this invention is a fluid velocity measuring device which yields the foregoing advantages and which is simply constructed and easy to operate.

Other objects and advantages of the present invention will be readily apparent from the following description and drawings which illustrate a preferred embodiment of the present invention.

SUMMARY OF THE INVENTION

The present invention involves a fluid velocity measuring device, positionable in a freestream of fluid flow to cause vortices to be created at a frequency proportional to the rate of flow, utilizing sensors to generate signals representative of fluid velocity, the frequencies of which are proportional to fluid flow speed and the amplitudes of which are indicative of fluid flow direction.

The device includes a housing mounted around a spindle fixed at one and to some reference structure. Bearings provide a low friction contact and alignment between the housing and the mounting spindle. Sensors are mounted between the housing and the mounting spindle to measure rotational forces caused by vortex creation and translational drag forces relative to the reference structure. The sensors generate electric signals which are translated into indications of fluid flow speed and direction by additional electric circuitry.

BRIEF DESCRIPTION OF THE DRAWINGS

FIG. 3 is a plan view similar to FIG. 2 showing the direction of forces incurred by flow from angle $\beta$ on force sensors;

FIG. 5 is a graph of the relative magnitude of the forces of FIG. 3 as a function of time.

DESCRIPTION OF PREFERRED EMBODIMENT

Figure 1:
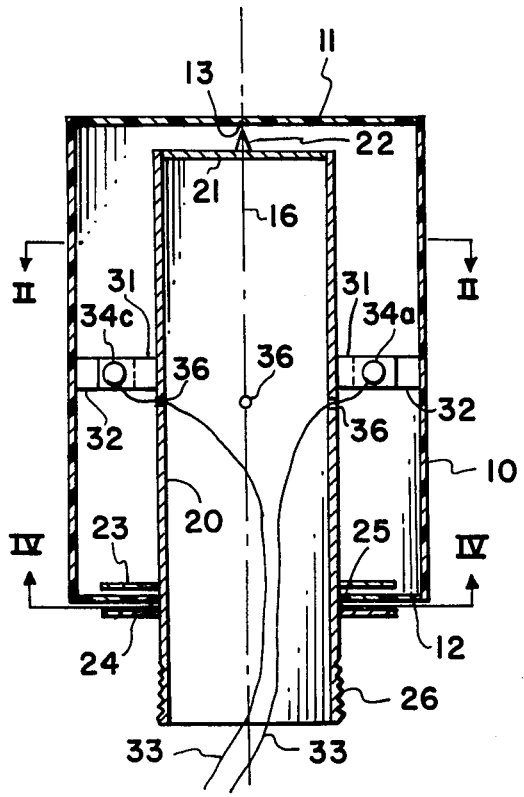
FIG. 1 is an elevational sectional view of a fluid velocity measuring device as viewed along the line I—I of FIG. 2.

Referring to FIG. 1, a fluid velocity measuring device includes a hollow cylindrical housing shell 10 enclosed on the top by an upper cover 11 and enclosed on the bottom by a lower cover 12 and positioned concentrically about a hollow cylindrical mounting spindle 20 having threads 26 for fixing to a reference structure and enclosed on the top by a spindle cover 21. The spindle 20, the shell 10, upper cover 11, lower cover 12, and spindle cover 21 share a common axis of symmetry 16. A pivot bearing 22 affixed to the upper surface of spindle cover 21 at the axis of symmetry 16 is accommodated by dimple 13 located on the bottom surface of upper cover 11 at the axis of symmetry 16.

Three point bearings 25 provide a low friction contact between spindle 20 and lower cover 12.

Figure 4:
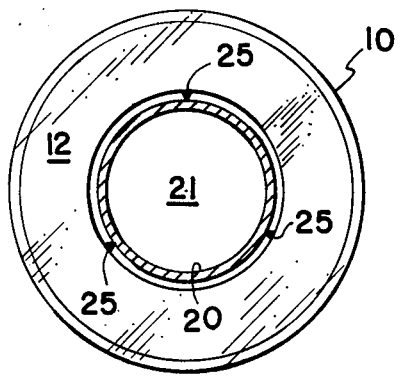
FIG. 4 is a sectional view taken along line IV—IV of FIG. 1.

As shown more particularly in FIG. 4, the three point bearings 25 of the preferred embodiment are spaced at 120 degree intervals about spindle 20.

Referring back to FIG. 1, an upper deflection plate 23 and a lower deflection plate 24 rigidly attached to spindle 20 preclude excess vertical movement of the housing and inhibit the entry of foreign particles into the device.

Figure 2:
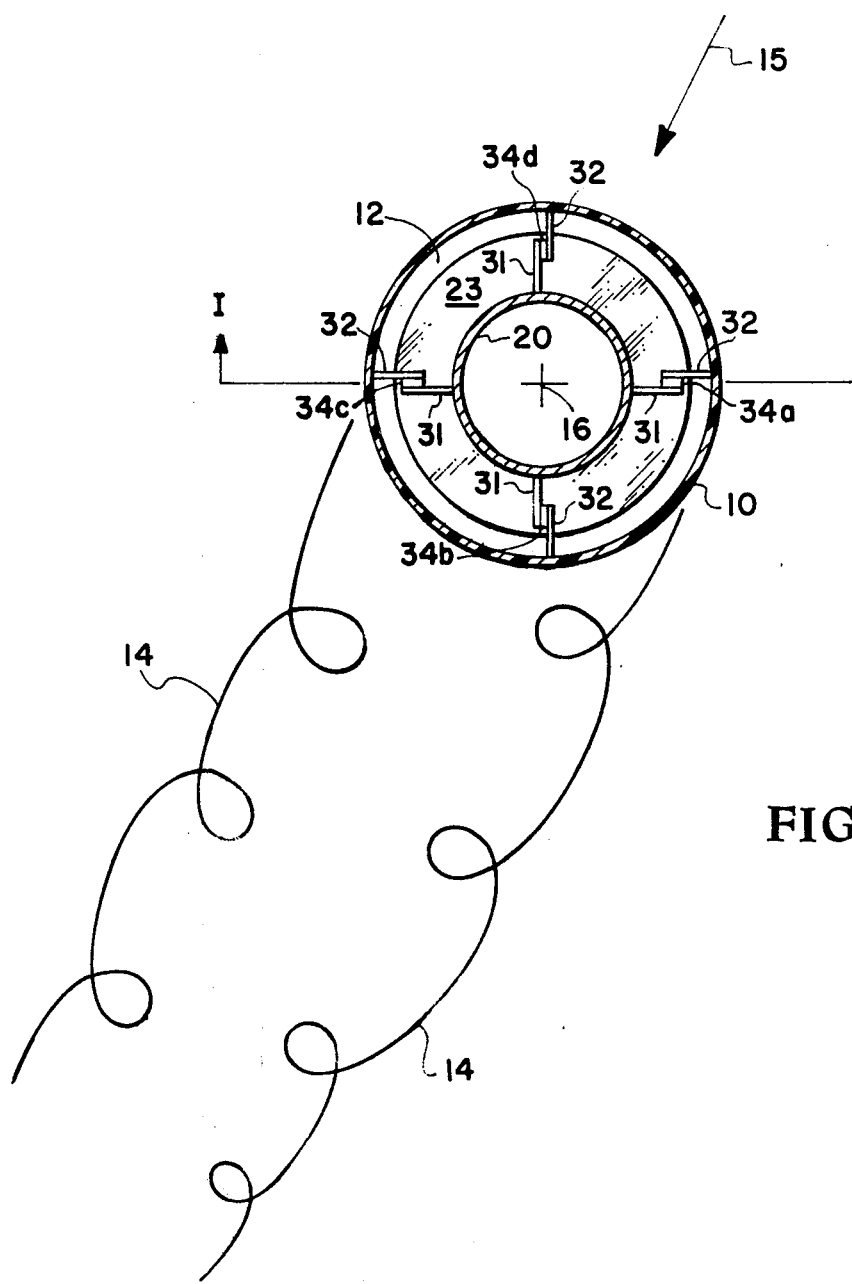
FIG. 2 is a plan sectional view taken along the line II—II of FIG. 1.

Referring now to FIG. 2, four force sensing electrically insulated piezoelectric crystals 34a, 34b, 34c, and 34d are positioned between spindle 20 and shell 10 at 90 degree intervals on a plane perpendicular to axis of symmetry 16.

Each crystal 34a, 34b, 34c, and 34d is attached on one side to a spindle tab 31 and on the other side to a housing tab 32. The spindle tab 31 is rigidly attached to the spindle 20 and the housing tab 32 is rigidly attached to the shell 10. When the device is positioned in a freestream of fluid flow 15, vortices 14 are created alternately on either side of the shell 10 at a frequency proportional to the rate of freestream fluid flow 15.

The formation of the vortices 14 creates an oscillatory rotational force on shell 10. The shell 10 would be essentially free to rotate about axis of symmetry 16, being supported and aligned by bearings 22 and 25, were it not for the interference between housing tabs 32 and spindle tabs 31 separated by piezoelectric crystals 34a, 34b, 34c, and 34d. The force exerted on the shell 10 by the shedding of vortices 14 is translated via housing tabs 32 through piezoelectric crystals 34a, 34b, 34c, and 34d, and to the spindle tab 31 which is rigid with respect to the reference structure.

The forces on the crystals 34a, 34b, 34c, and 34d induce voltage signals therefrom having amplitudes proportional to the magnitude of the forces thereon. These voltages are transferred from each piezoelectric crystals 34a, 34b, 34c, and 34d through wires 33 which extend through holes 36 in spindle 20 to electric circuitry which is capable of deducing fluid speed and direction therefrom. There is a corresponding wire 33 for each crystal 34a, 34b, 34c, and 34d although wires 33 are only shown in FIG. 1 and then only for crystals 34a and 34c.

Referring to FIG. 3, the freestream fluid flow 15 is incident upon shell 10 at angle $\beta$ with respect to some arbitrary predetermined reference plane. As shown in FIG. 3, the reference plane is the $+X$ axis which is perpendicular to and with origin at the axis of symmetry 16 and passes through piezoelectric crystals 34b and 34d of the preferred embodiment. The incident angle $\beta$, equals zero when fluid flow 15 is incidental along the reference plane, i.e. the $+X$ axis, and becomes increasingly positive as the direction of incidence is rotated clockwise therefrom and increasingly negative as the direction of incidence is rotated counter clockwise therefrom. Crystals 34a, 34b, 34c, and 34d are directionally biased such that only forces in the biased direction induce voltages.

In the preferred embodiment, crystals 34a and 34c are biased such that only forces parallel to the X axis can induce voltages. Crystals 34b and 34d are biased such that only forces parallel to the Y axis can induce voltages.

By convention, positive and negative voltages are induced across wires 33 by compressive and expansive forces respectively on the crystals 34a, 34b, 34c, and 34d. When the forces applied to the crystals 34a, 34b, 34c, and 34d by the shell tabs 32 are in the directions shown by the arrows in FIG. 3, the forces are compressive and therefore by convention are positive. Conversely, if the forces are in the opposite direction they are expansive and therefore by convention are negative.

The incident fluid flow 15 creates a translation drag force on the outside surface of the cylindrical shell 10 at angle $\beta$ and the shedding of vortices 14 alternately from one side then from the other side creates on oscillating rotational force on the outside surface of cylindrical shell 10. It can be said that rotary and translational motions of shell 10 relative to spindle 20 result from the rotary and translational forces respectively thereon. Although concern here is with the forces and not the motions, technically, the forces will inevitably induce motion, however slight, of shell 10 with respect to spindle 20.

Assuming a constant angle of incidence, $\beta$, and a constant fluid speed s, for purpose of illustration, the net time varying force functions $F_a$, $F_b$, $F_c$, and $F_d$, on the piezoelectric crystals 34a, 34b, 34c, and 34d are shown in FIG. 5. These functions represent only the forces in the bias directions.

The forces on the crystals 34a, 34b, 34c, and 34d in the bias direction due to translational drag, $F_{TD_a}$, $F_{TD_b}$, $F_{TD_c}$, and $F_{TD_d}$, respectively, are constant and equal to the total force on the crystals 34a, 34b, 34c, and 34d, due to translational drag in direction $\beta$, $F_{TD}$, multiplied by sine $\beta$ for crystals 34b and 34d and cosine $\beta$ for crystals 34a and 34c.

$$F_{TD_a} = F_{TD_c} = F_{TD} \cos \beta \qquad (1)$$

$$F_{TD_b} = F_{TD_d} = F_{TD} \sin \beta \qquad (2)$$

The force on the crystals 34a, 34b, 34c, and 34d in the bias directions due to the shedding of vortices, $F_{VS_a}$, $F_{VS_b}$, $F_{VS_c}$, and $F_{VS_d}$, respectively, is oscillatory. In the preferred embodiment this force is equal in magnitude but of opposite sign for diametrically opposed crystals 34a and 34c and for diametrically opposed crystals 34b and 34d.

Therefore, $$F_{VS_a} = -F_{VS_c} \qquad (3)$$

$$F_{VS_b} = -F_{VS_d} \qquad (4)$$

The total force on each crystal 34a, 34b, 34c, or 34d in the bias direction, $F_a$, $F_b$, $F_c$, or $F_d$, respectively, is equal to the sum of the force in the bias direction due to translational drag plus the force in the bias direction due to the shedding of vortices.

$$F_a = F_{TD_a} + F_{VS_a} \qquad (5)$$

$$F_b = F_{TD_b} + F_{VS_b} \qquad (6)$$

$$F_c = F_{TD_c} + F_{VS_c} \qquad (7)$$

$$F_d = F_{TD_d} + F_{VS_d} \qquad (8)$$

The direction of fluid flow is determined by calculating in terms of measurable quantities, i.e. the voltages induced by forces $F_a$, $F_b$, $F_c$, and $F_d$ on the crystals 34a, 34b, 34c, and 34d.

Adding equations (5) and (7) and adding equations (6) and (8), $$F_a + F_c = F_{TD_a} + F_{VS_a} + F_{TD_c} + F_{VS_c} \qquad (9)$$

$$F_b + F_d = F_{TD_b} + F_{VS_b} + F_{TD_d} + F_{VS_d} \qquad (10)$$

Substituting equations (3) and (4) into equations (9) and (10)

$$F_a + F_c = F_{TD_a} - F_{VS_c} + F_{TD_c} + F_{VS_c}$$

or, $$F_a + F_c = F_{TD_a} + F_{TD_c} \quad (11)$$

and, $$F_b + F_d = F_{TD_b} - F_{VS_d} + F_{TD_d} + F_{VS_d}$$

or, $$F_b + F_d = F_{TD_b} + F_{TD_d} \quad (12)$$

Substituting equations (1) and (2) into equations (11) and (12) respectively, $$F_a + F_c = 2F_{TD} \cos \beta \quad (13)$$

$$F_b + F_d = 2F_{TD} \sin \beta \quad (14)$$

Dividing equation (14) by equation (13), $$\frac{F_b + F_d}{F_a + F_c} = \frac{2F_{TD} \sin \beta}{2F_{TD} \cos \beta}$$

or, $$\frac{F_b + F_d}{F_a + F_c} = \frac{\sin \beta}{\cos \beta} = \tan \beta \quad (15)$$

Taking the arc tangent of both sides of equation (15)

$$\beta = \arctan\left(\frac{F_b + F_d}{F_a + F_c}\right) \quad (16)$$

And, for identical crystals 34a, 34b, 34c, and 34d which generate voltages $V_a$, $V_b$, $V_c$, and $V_d$, respectively, equally proportional to force thereon, equation (16) can be rewritten $$\beta = \arctan\left(\frac{V_b + V_d}{V_a + V_c}\right) \quad (17)$$

The direction, $\beta$, of freestream flow 15 is given by equation (17) in terms of the measurable quantities $V_a$, $V_b$, $V_c$, and $V_d$. The fluid speed S is proportional to the vortex creation frequency, $f$, and is determined by the simple relationship $$S = kf \quad (18)$$

where $k$ is a constant ($\approx 0.19$).

Figure 6:
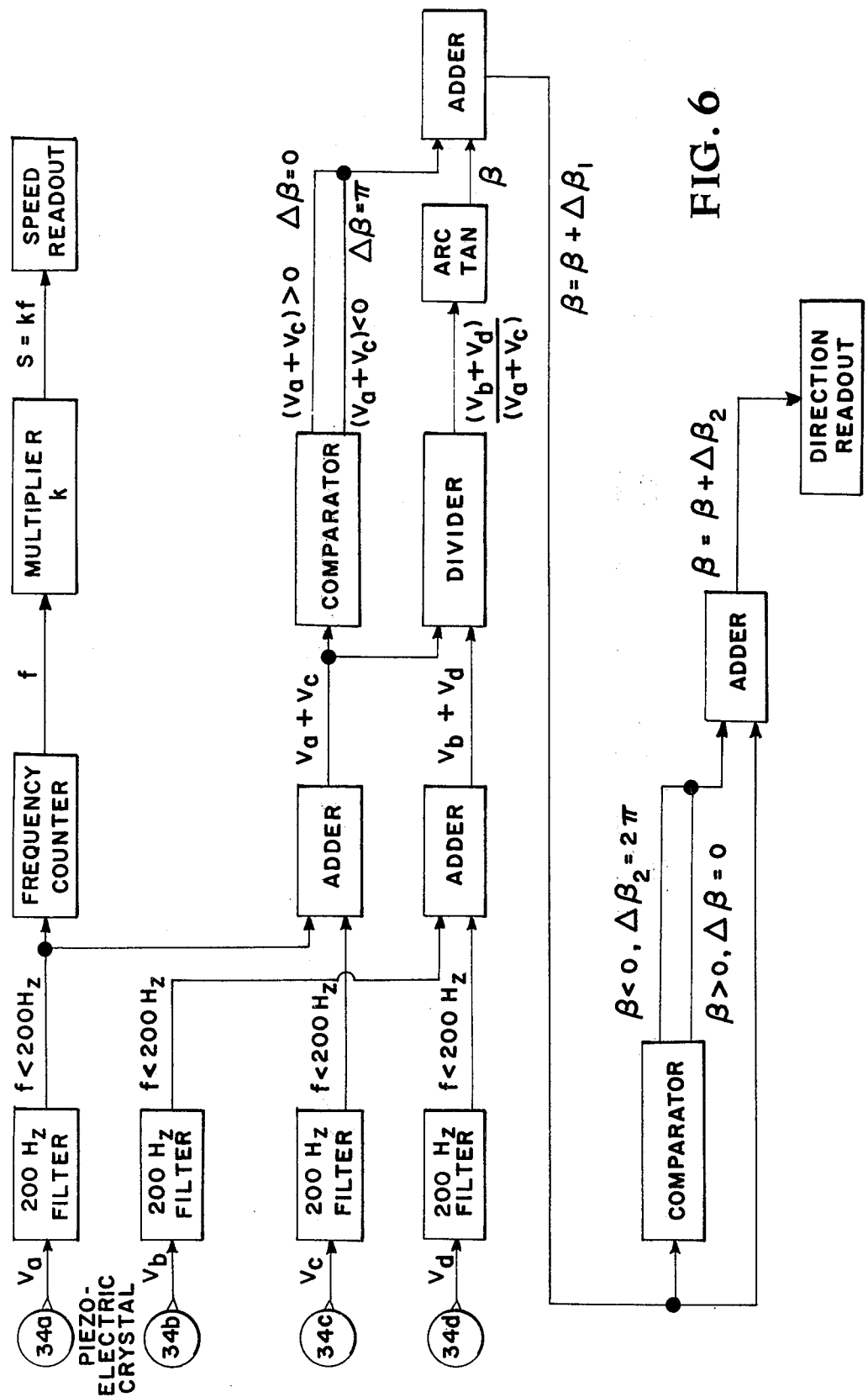
FIG. 6 is a schematic diagram of the electrical circuit employed in the present invention and capable of interpreting electric signals into secondary signals proportional to the fluid velocity components of speed and direction.

FIG. 6 is a schematic of a simple electric circuit for performing equations (17) and (18). The force induced crystal voltage signals are first filtered, eliminating all frequencies above 200 cycles per second, to preclude the passage of structural material resonance frequency signals. Fluid speed, S, is calculated by taking any one of the filtered signals ($V_a$ is used for purpose of illustration of FIG. 6), feeding it into a frequency counter and multiplying the resulting frequency signal by a constant, $k$, to obtain the fluid speed, $S = kf$. The calculated speed signal is at this point fed to a speed readout.

The fluid direction equation (17) is calculated in the remainder of the circuit of FIG. 6. $V_a$ is added to $V_c$ and $V_b$ is added to $V_d$. Thus $(V_b+V_d)/(V_a+V_c)$ is taken to find $\beta$. Since the arc tangent function only yields values from $+90°$ to $-90°$ an additional test must be performed to determine if a correction must be made to obtain the true angle $\beta$. If $(V_a+V_c) > 0$, angle of incidence $\beta$ is left as calculated, but if $(V_a+V_c) > 0°$, 180° is added to $\beta$. The true angle $\beta$ has been determined at this point. However, it will have a value from $-90°$ to 270° and since it is preferable to have values between 0° and 360°, $\beta$ is now tested and corrected by adding 360° thereto. The fluid flow direction signal is at this point fed to a direction readout.

The above described fluid velocity measuring device is constructed primarily of metallic material. However, the shell 10, upper cover 11, and lower cover 12 are plastic for the purpose of minimizing material resonance frequency signals in the electric circuit. The use of these materials in the preferred embodiment is not intended to limit the present invention thereto, and any suitable material may be used alternatively.

The above described fluid velocity measuring devices utilizes piezoelectric sensor crystals to sense vortex creation frequency and translational drag force in a freestream of fluid flow. It is understood that other electric sensing devices capable of generating signals having frequency proportional to vortex creation frequency and amplitudes representative of fluid flow direction, including strain gauges and induction coils but not excluding others, may also be employed.

The above description and drawings are only illustrative of one embodiment which achieves the objects, features, and advantages of the present invention, and it is not intended that the present invention be limited thereto. All modifications of the present invention which come within the spirit and scope of the following claims are considered part of the present invention.

What is claimed as new and desired to be secured by Letters Patent of the United States is:

1. A fluid velocity measuring device positionable in a freestream of fluid flow to cause vortices to be shedded therefrom at a frequency proportional to fluid flow speed, said device comprising:
    a housing mounted on a spindle;
    said housing being capable of oscillatory rotary motion about said spindle induced by, and at a frequency indicative of, the periodic shedding of vortices therefrom; said housing being further capable of translational motion relative to said spindle induced by, and indicative of the direction of, said freestream fluid flow;
    said spindle fixable at one end to a reference structure and extending into said housing;
    bearing means providing low friction contact and alignment of said housing with said spindle;
    force sensing means attached between said housing and said spindle capable of generating an electric signal indicative of said vortex creation frequency and indicative of the direction of translational drag force on said housing by said fluid flow; and
    electric circuitry for translating said electric signal into a readout of fluid speed and direction.

2. A fluid velocity measuring device as in claim 1 wherein said force sensing means includes four sensors positioned at 90° intervals around said spindle.

3. A fluid velocity measuring device as in claim 1 wherein said housing is cylindrical.

4. A fluid velocity measuring device positionable in a freestream of fluid flow to cause vortices to be created in the fluid at a frequency proportional to fluid flow speed, said device comprising:
- (a) a housing including a hollow cylindrical shell concentric about an axis of symmetry, a circular cover attached to one end of said shell, a pivot bearing receiving means located on the inside surface of said circular cover, a ring shaped cover attached to the other end of said shell;
- (b) a hollow cylindrical mounting spindle, fixable at one end to a reference structure, extending through said ring-shaped cover and concentrically through said housing and terminating before reaching said circular cover,
- (c) a single cover rigidly attached to the end of said spindle positioned inside of said housing,
- (d) a pivot bearing rigidly attached to said spindle cover and extending to said pivot bearing receiving means,
- (e) a ring-shaped inner deflection plate rigidly attached to the outside surface of said spindle and positioned inside said housing parallel with said ring-shaped cover,
- (f) a ring-shaped outer deflection plate rigidly attached to the outside surface of said spindle and positioned outside said housing parallel with said ring-shaped cover,
- (g) at least three point bearings rigidly attached to said ring-shaped cover extending radially inward and aligning said housing concentric to said spindle,
- (h) at least three force sensing means adapted to sense forces by said stream of fluid on said housing relative to said spindle, each said force sensing means including:
  - (i) a spindle tab rigidly attached to and extending radially outward from said spindle,
  - (ii) a housing tab located correspondingly to said spindle tab rigidly attached to and extending radially inward from said housing,
  - (iii) an electrically insulated piezoelectric crystal, capable of generating an electric signal proportional to compressive and expansive force thereon, rigidly mounted between said spindle tab and said housing tab,
  - (iv) a pair of wires, one connected to each side of said crystal and extending through the wall of said spindle and through the inside and out the fixable end of said spindle, and
  - (v) an electric circuit means for receiving and translating said electrical signal from said set of force sensing means into an indication of fluid velocity.

5. A fluid velocity measuring device as in claim 4 wherein said force sensing means includes four sensors positioned at 90° intervals on a plane perpendicular to said axis of symmetry of said housing.

6. A fluid velocity measuring device as in claim 4 wherein there are three of said point bearings.

7. A fluid velocity measuring device as in claim 5 wherein said electric circuit means calculates an angle of incidence of said freestream fluid flow by taking the arc tangent of the ratio of the sum of signals of diametrically opposed said force sensing means.

* * * * *